(12) United States Patent
Scotti et al.

(10) Patent No.: US 11,994,181 B2
(45) Date of Patent: May 28, 2024

(54) DISC BRAKE CALIPER, METHOD FOR MANUFACTURING A CALIPER AND CALIPER SPRING

(71) Applicant: FRENI BREMBO S.P.A., Bergamo (IT)

(72) Inventors: Fabio Scotti, Curno (IT); Alessandro Insabato, Curno (IT); Andrea Teruzzi, Curno (IT); Cristian Crippa, Curno (IT)

(73) Assignee: Brembo S.p.A., Bergamo (IT)

( * ) Notice: Subject to any disclaimer, the term of this patent is extended or adjusted under 35 U.S.C. 154(b) by 72 days.

(21) Appl. No.: 17/806,956

(22) Filed: Jun. 15, 2022

(65) Prior Publication Data

US 2022/0356921 A1 Nov. 10, 2022

Related U.S. Application Data

(62) Division of application No. 15/776,829, filed as application No. PCT/IB2016/056864 on Nov. 15, 2016, now Pat. No. 11,384,804.

(30) Foreign Application Priority Data

Nov. 17, 2015 (IT) .................. 102015000073426

(51) Int. Cl.
*F16D 65/00* (2006.01)
*B22C 9/10* (2006.01)
*F16D 55/228* (2006.01)
*F16D 55/00* (2006.01)

(52) U.S. Cl.
CPC ............ *F16D 65/0075* (2013.01); *B22C 9/10* (2013.01); *F16D 55/228* (2013.01); *F16D 65/0068* (2013.01); *F16D 2055/0016* (2013.01); *F16D 2055/0091* (2013.01); *F16D 2200/0021* (2013.01); *F16D 2250/0007* (2013.01); *F16D 2250/0015* (2013.01)

(58) Field of Classification Search
CPC ............................................... F16D 2250/0007
See application file for complete search history.

(56) References Cited

U.S. PATENT DOCUMENTS

| 4,993,520 A | 2/1991 | Goddard et al. |
| 6,173,819 B1 | 1/2001 | Meiss et al. |
| 7,232,015 B1 | 6/2007 | Umehara et al. |

(Continued)

FOREIGN PATENT DOCUMENTS

| CN | 101363487 A | 2/2009 |
| CN | 102906444 A | 1/2013 |

(Continued)

OTHER PUBLICATIONS

China National Intellectual Property Administration, Chinese Office Action issued in Application 201680066921.5, dated Mar. 5, 2019, 6 pages, China National Intellectual Property Administration.

(Continued)

*Primary Examiner* — Melody M Burch
(74) *Attorney, Agent, or Firm* — Marshall & Melhorn, LLC (57) ABSTRACT

A disc brake caliper has a caliper body and a pair of pads and, in each side portion of the caliper body, a distal piston and a proximal piston, having radially distanced and aligned pressure centers.

8 Claims, 9 Drawing Sheets

(56) References Cited

U.S. PATENT DOCUMENTS

| | | |
|---|---|---|
| 7,958,975 B2 | 6/2011 | Eisengraber et al. |
| 8,132,612 B2 | 3/2012 | Morais et al. |
| 9,291,224 B2 | 3/2016 | Crippa et al. |
| 9,803,709 B2 | 10/2017 | Misumi et al. |
| 2007/0240946 A1 | 10/2007 | Schorn et al. |
| 2008/0053759 A1 | 3/2008 | Tait |
| 2012/0085600 A1 | 4/2012 | Suzuki et al. |
| 2013/0092481 A1 | 4/2013 | Crippa et al. |
| 2016/0131208 A1 | 5/2016 | Misumi et al. |
| 2016/0184883 A1 | 6/2016 | Arai et al. |

FOREIGN PATENT DOCUMENTS

| | | | |
|---|---|---|---|
| CN | 103307148 A | 9/2013 | |
| CN | 105051397 A | 11/2015 | |
| DE | 4301684 A1 | 8/1994 | |
| DE | 102005026799 A1 | 12/2006 | |
| DE | 102006052177 A1 | 5/2008 | |
| EP | 1898116 A1 | 3/2008 | |
| EP | 2553289 B1 | 1/2015 | |
| JP | S62114226 U | 7/1987 | |
| JP | H02186131 A | 7/1990 | |
| JP | H0742774 A | 2/1995 | |
| JP | 3227584 B2 | 11/2001 | |
| JP | 2009041775 A | 2/2009 | |
| JP | 2010007686 A | 1/2010 | |
| JP | 2012189188 A | 10/2012 | |
| JP | 2015059657 A | 3/2015 | |
| JP | 5700300 B2 * | 4/2015 | ............... B22C 9/24 |
| KR | 101241229 B1 * | 3/2013 | |
| WO | WO-2007000780 A1 * | 1/2007 | ............... B22C 9/10 |
| WO | WO-2016204427 A1 * | 12/2016 | ............... B22C 9/10 |

OTHER PUBLICATIONS

Japanese Patent Office, Office Action issued in application No. 2018524239 dated Sep. 8, 2020, 2 pages.

European Patent Office, International Search Report with Written Opinion, issued in PCT/IB2016/056864, dated Jan. 17, 2017, 14 pages, European Patent Office, Rijswijk, Netherlands.

* cited by examiner

DISC BRAKE CALIPER, METHOD FOR MANUFACTURING A CALIPER AND CALIPER SPRING

FIELD

The present invention relates to the field of braking systems for vehicles, and in particular the present invention relates to a disc brake caliper.

Very briefly, a disc brake consists of a disc, which is integral in rotation with the vehicle wheel, and a fixed caliper, in which a pair of pads carrying friction material are housed. The caliper also holds pistons which, by being hydraulically operated, push the pads against the disc surfaces, thus obtaining the braking by virtue of the action of the friction material.

The number and relative position of the pistons considerably influence the action of the disc brake; for example, important factors depend on them, such as caliper rigidity, from which a more or less prompt braking derives, friction material consumption evenness, and the like.

SUMMARY

It is the object of the present invention to obtain a disc brake caliper capable of obtaining a particularly prompt and immediate braking.

Such an object is achieved by a caliper made according to the claims. The claims dependent thereon describe variant embodiments.

BRIEF DESCRIPTION OF THE DRAWINGS

The features and advantages of the caliper according to the present invention will be apparent from the following description, given by way of non-limiting example, according to the accompanying drawings, in which:

FIG. 6 shows the pressure distribution in a pad of a caliper according to the present invention, while

DETAILED DESCRIPTION

With reference to the accompanying figures, reference numeral 1 indicates a disc brake caliper according to an embodiment of the present invention, intended to be arranged straddling a disc rotatable about a rotation axis Z.

2

Hereinafter, the expressions "axial direction" or "axially" will be used with reference to a direction parallel to the rotation axis Z of the disc, the expressions "radial direction" or "radially" will be used with reference to a radial direction with respect to the rotation axis and the expressions "circumferential direction" or "circumferentially" will be used with reference to a circumferential pattern about the rotation axis.

The caliper 1 comprises a caliper body 2, usually monolithic, preferably made by gravity casting.

The caliper body 2 consists of:

a first side portion 2a and a second side portion 2b, which when the caliper is coupled to the disc have prevailing extension along the circumferential direction and border the surfaces of the disc;

a front bridge portion 4a and a rear bridge portion 4b, placed at circumferential ends of the side portions 2a, 2b and straddling the disc;

an upper axial portion 6a, placed straddling the disc, which joins the first side portion 2a and the second side portion 2b, has predominantly axial extension and is placed in an intermediate position between the front portion 4a and the rear portion 4b; and an upper circumferential portion 6b, which joins the front portion 4a and the rear portion 4b, has predominantly circumferential extension and is placed in an intermediate position between the first side portion 4a and the second side portion 4b.

The upper portions 6a, 6b intersect in a central portion 8, making a cross body consisting of axial arms 6a', 6a" and circumferential arms 6b', 6b".

Preferably, each axial arm 6a', 6a" is tapered from the respective side portion 2a, 2b towards the central portion 8.

Piston chambers, accommodating therein a respective piston, which can be hydraulically actuated by means of pressurized oil fed by means of a hydraulic circuit, also prevalently obtained in the pump body, are obtained within the pump body 2, and in particular in the side portions 2a, 2b thereof.

The caliper 1 further comprises a pair of pads 20, accommodated in the caliper body 2, supported in slidable manner so as to allow an axial sliding under the bias of the pistons.

Preferably, the caliper according to the present invention has eight pistons, operating in fours on a respective pad.

In particular, the pad 20 can be biased by an intermediate distal piston 22a, by an intermediate proximal piston 22b, by a front side piston 24a and by a rear side piston 24b.

Having identified the rotation axis Z of the disc, the pressure centers 24a', 24b' of the side pistons 24a, 24b lie on an imaginary circumference I centered on the rotation axis Z, at a predetermined angular distance A, while the pressure centers 22a', 22b' of the intermediate pistons 22a, 22b are contained angularly in the angular region identified by the angular distance A.

Preferably, the pressure center 22a' of the first intermediate piston 22a lies on the bisector B which bisects the angular region identified by the angular distance A, at a first radial distance Ra from the rotation axis Z; for example, the pressure center 22a' of the distal intermediate piston 22a lies on the imaginary circumference I.

Furthermore, according to the invention, the pressure center 22b' of the proximal intermediate piston 22b lies on the bisector B, at a second radial distance Rb from the rotation axis Z, smaller than the first radial distance Ra.

In other words, the pressure center 22a' of the distal intermediate piston 22a and the pressure center 22b' of the proximal intermediate piston 22b are distanced and radially aligned along a radial direction R.

With respect to the pad 20, the pressure centers 22a', 22b', 24a', 24b' fall within the contour of the pad, preferably at the vertexes of an imaginary rhombus for which the minor diagonal is arranged radially. Preferably, the entire sections of the pistons 22a, 22b, 24a, 24b fall within the contour of the pad.

Figure 5:
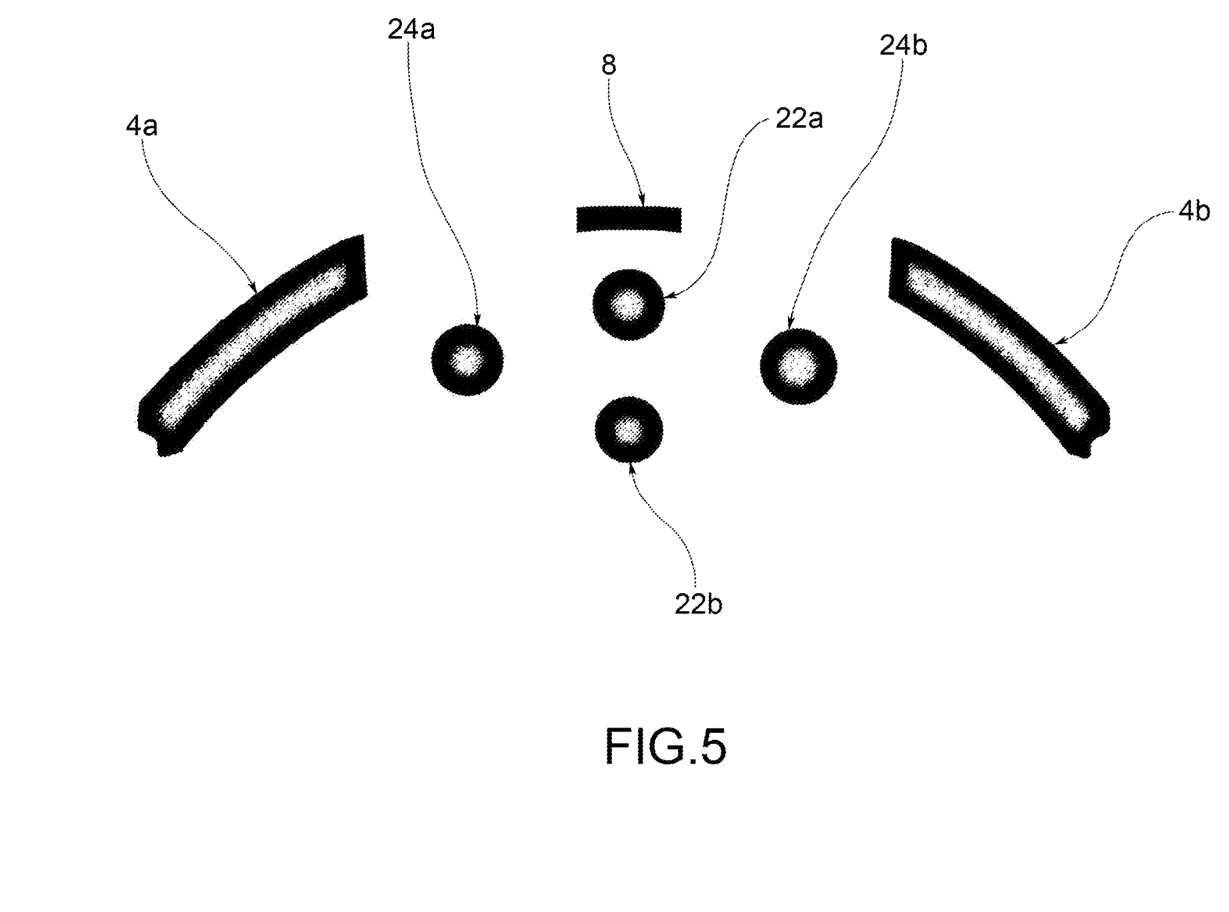
FIG. 5 shows a diagram highlighting the position of the center of gravity of the bridge portions and of the center of gravity of the piston areas in the caliper in FIG. 1.

Having positioned the pad 20 in the caliper body 2, the central portion 8 of the caliper body 2 intersects the radial direction R of the pressure centers 22a', 22b' of the intermediate pistons 22a, 22b, preferably symmetrically, while the front bridge portion 4a and the rear bridge portion 4b are arranged circumferentially externally to the pressure centers 24a', 24b' of the side pistons 24a, 24b (FIG. 5).

Advantageously, the center of gravity of the front bridge portion 4a, of the rear bridge portion 4b and of the central portion 8 is close to the center of gravity of the pistons 22a, 22b, 24a, 24b, thus resulting in a particularly rigid caliper, i.e. capable of developing a particularly prompt and vigorous braking.

Figure 6:
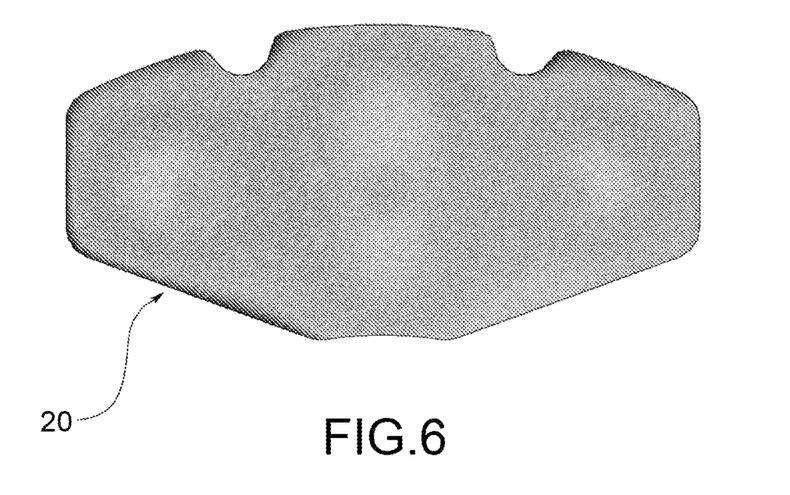
Figure 7:
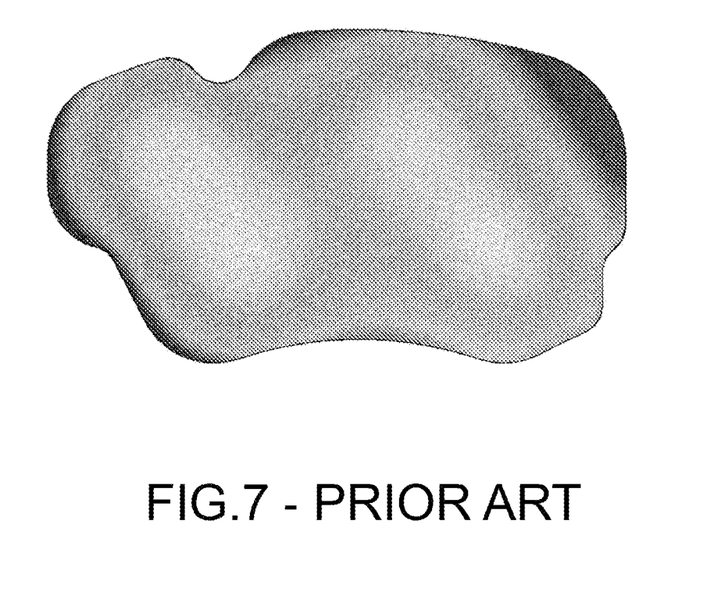
FIG. 7 shows the pressure distribution in a pad of a caliper according to the prior art.

Furthermore, advantageously during braking, the load distribution on the pad is particularly uniform (FIG. 6) with respect to the distribution of a usual pad of the prior art (FIG. 7). This allows, in the caliper according to the invention, to reduce the anomalous, non-uniform consumption of the friction material and to improve the braking action.

Figure 8:
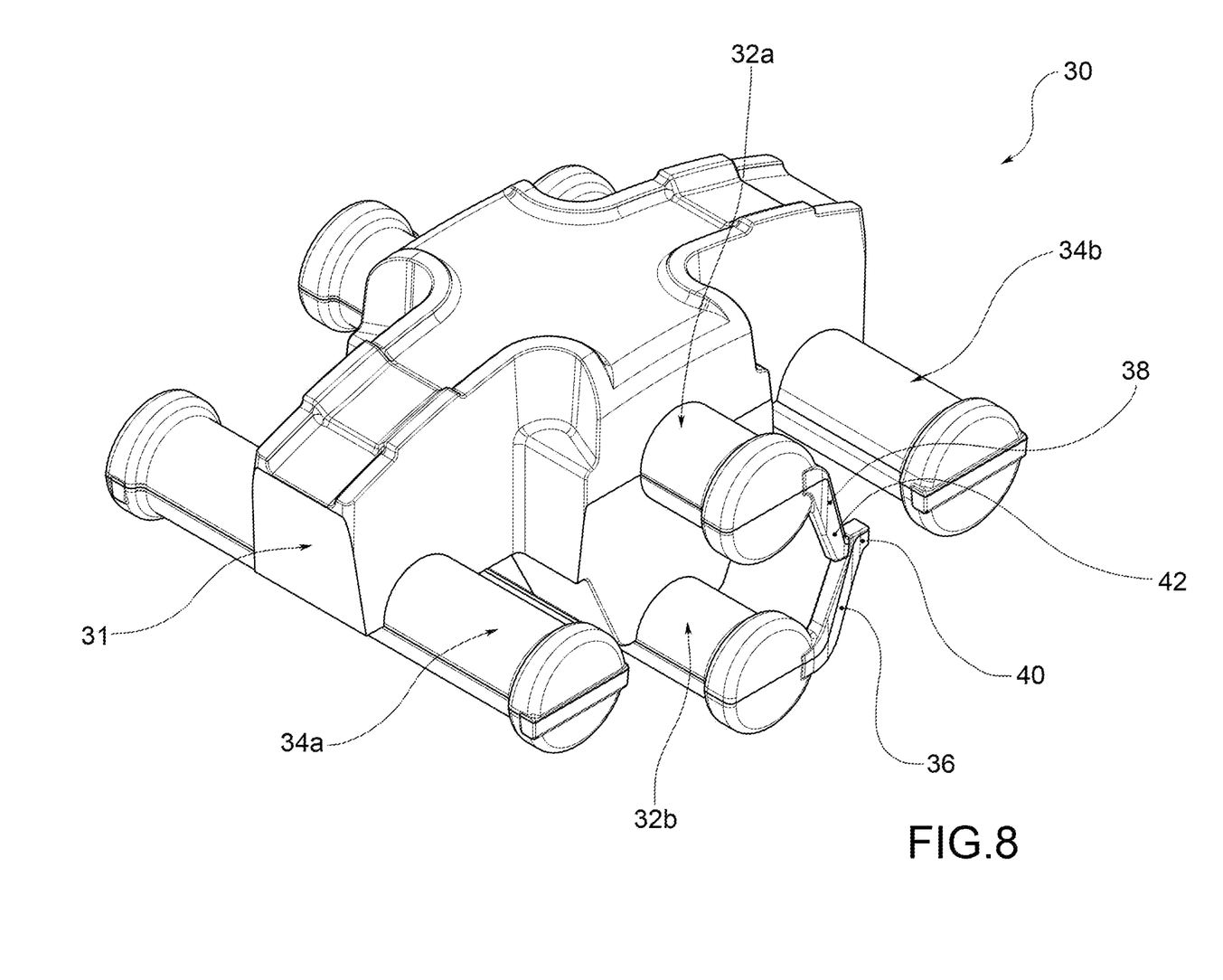
FIG. 8 shows a lost core for making a caliper body of a caliper according to a further aspect of the present invention.

According to a further aspect of the invention, during the casting of the caliper body according to the present invention, a lost core 30 is used, consisting of a cross-shaped core body 31, intended to obtain in the caliper body the space for housing the pads, from which the intermediate chamber cores 32a, 32b for making the chambers for the intermediate pistons 22a, 22b, and the side chamber cores 34a, 34b for making the chambers for the side pistons 24a, 24b axially protrude, on one side and on the other (FIG. 8).

Preferably, the core 30 includes at least one circuit branch core which connects at least two piston chamber cores for making a circuit branch of the pressurized oil feeding circuit.

In particular, the core 30 has a proximal branch core 36 which protrudes from the proximal piston chamber core 32b and extends towards the distal piston chamber core 32a and a distal branch core 38 which protrudes from the distal piston chamber core 32a and extends towards the proximal piston chamber core 32b.

The proximal branch core 36 and the distal branch core 38 terminate with a respective free end 40, 42 which are very close to each other but separated. In other words, the proximal branch core 36 and the distal branch core 38 are separate from each other, also on the tip.

Figure 9:
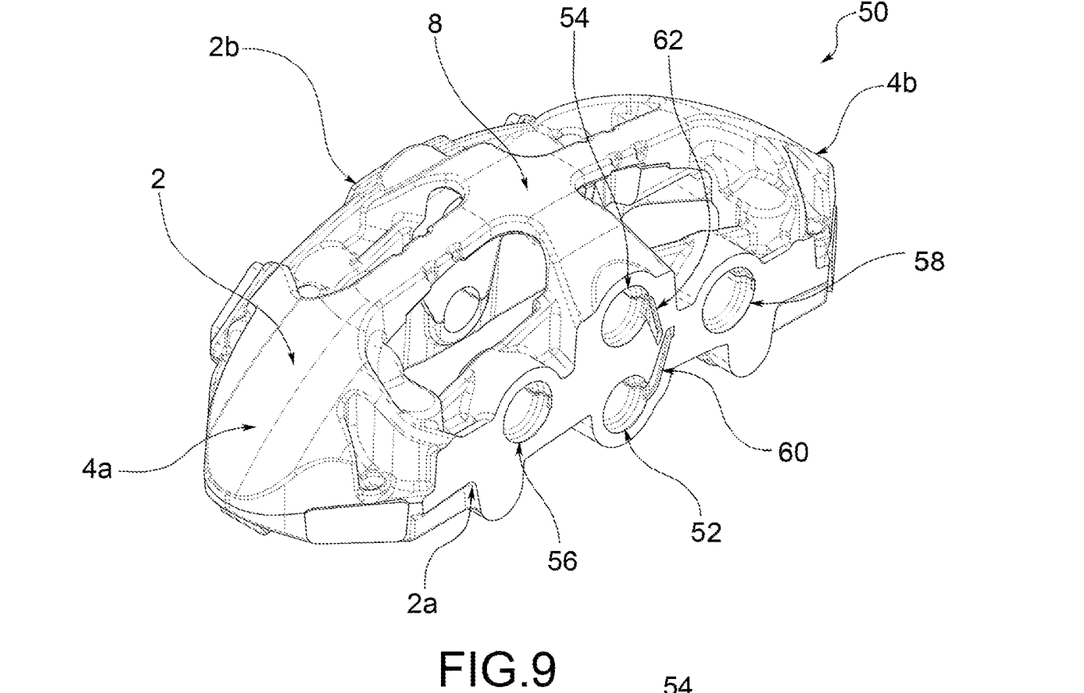
FIGS. 9 and 10 show semi-finished caliper bodies according to the present invention.

From the casting, after having eliminated the core 30, a semi-finished caliper body 50 is obtained, which is provided, in the side portion 2a, 2b, with the proximal piston chamber 52 and with the distal piston chamber 54 for housing the proximal intermediate piston 22b and the distal intermediate piston 22a, respectively, and with the front piston chamber 56 and with the rear piston chamber 58 for housing the front side piston 24a and the rear side piston 24b, respectively (FIG. 9).

Furthermore, a proximal circuit branch 60 extends from the proximal piston chamber 52 towards the distal piston chamber 54 and a distal circuit branch 62 extends from the distal piston chamber 54 towards the proximal piston chamber 52.

In the semi-finished caliper 50, the proximal circuit branch 60 does not intercept the distal circuit branch 62, i.e. said branches 60, 62 are separate, as the respective branch cores 36, 38 were.

Figure 10:
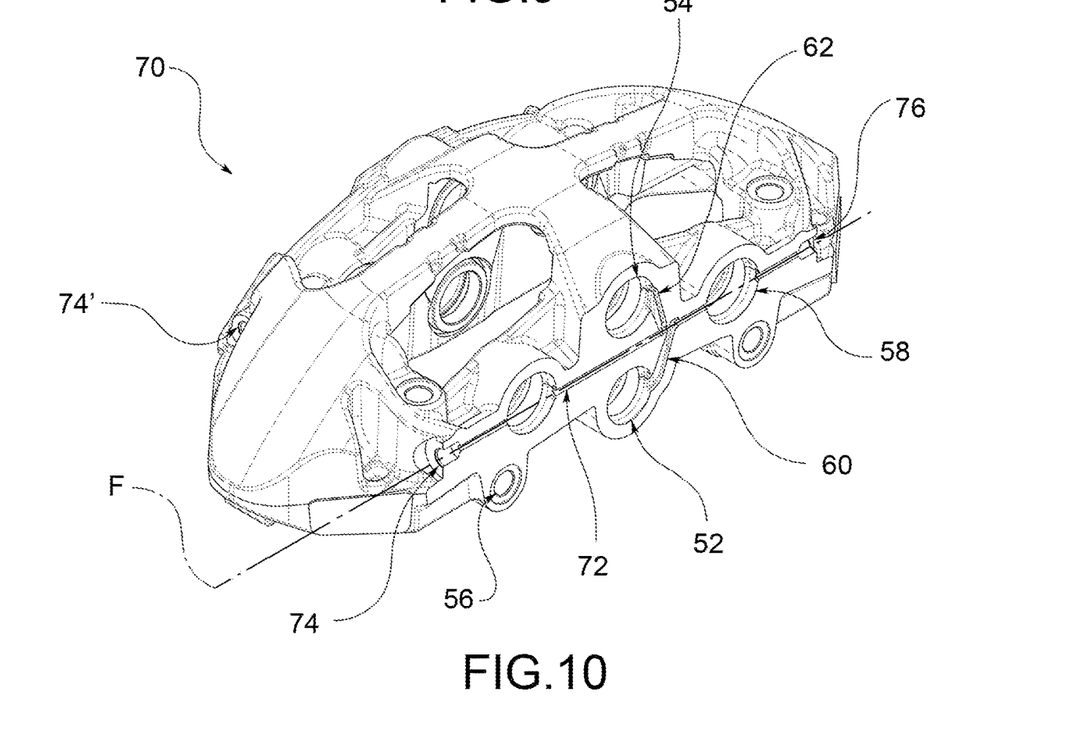

The semi-finished caliper 50 is subjected to processing by material removal, in particular a first hole is made to remove the material from the caliper body which separates the proximal circuit branch 60 from the distal circuit branch 62, thus putting them into communication (FIG. 10).

Preferably, a second hole is further made to put the front piston chamber 56 into communication with the rear piston chamber 58, preferably at the same time as the first hole is made, along the same perforation axis F.

A semi-finished perforated caliper body 70 is thus obtained, in which the proximal piston chamber 52 is connected to the distal piston chamber 54 by means of the proximal branch 60 and the distal branch 62 obtained in the caliper body 2, while the front piston chamber 56 is connected to the rear piston chamber 58 by means of a connection pipe 72 which also intercepts the proximal branch 60 and/or the distal branch 62.

Figure 1:
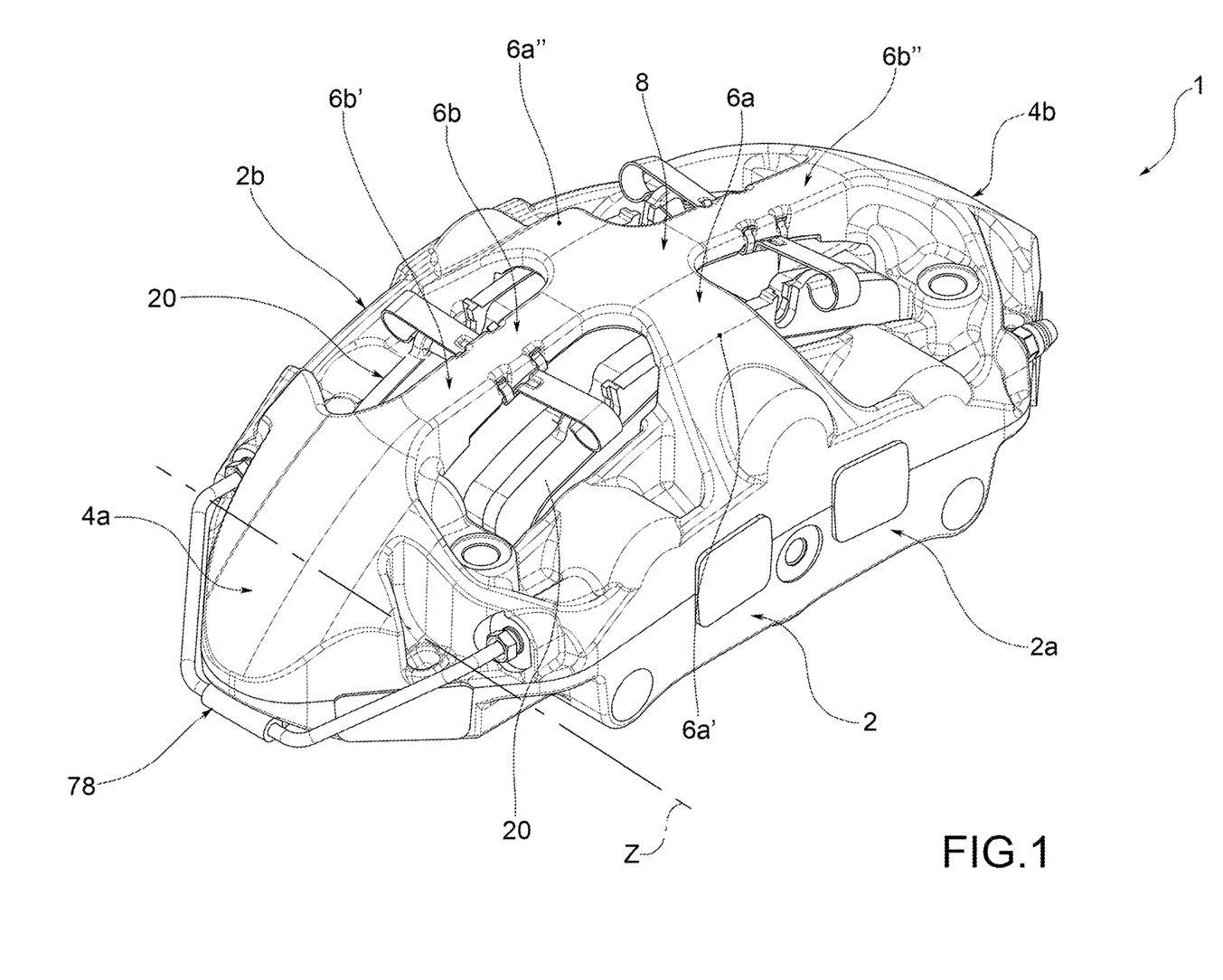
FIG. 1 shows a disc brake caliper according to an embodiment of the present invention.
Figure 2:
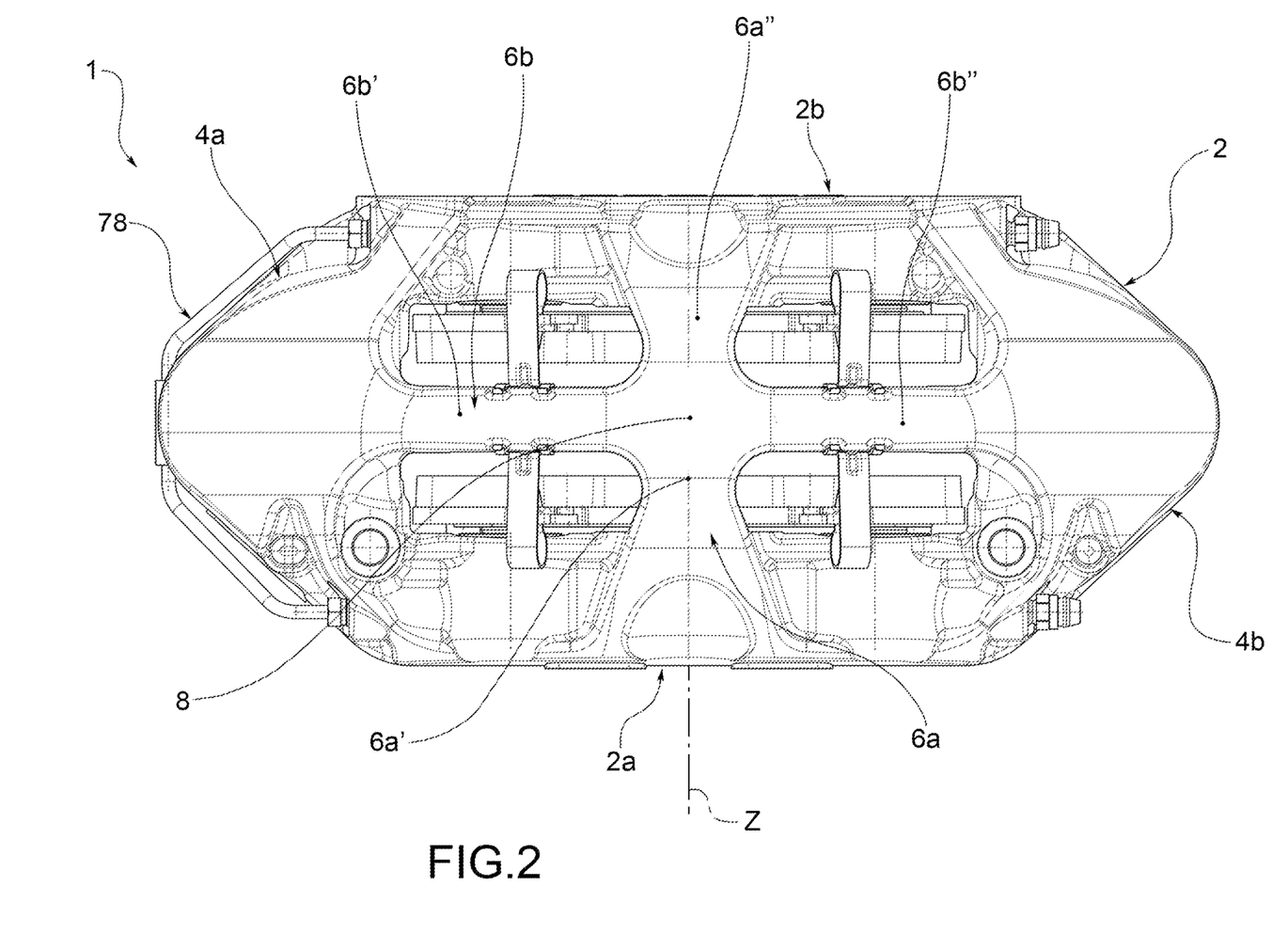
FIG. 2 shows a plan view of the caliper in FIG. 1.
Figure 3:
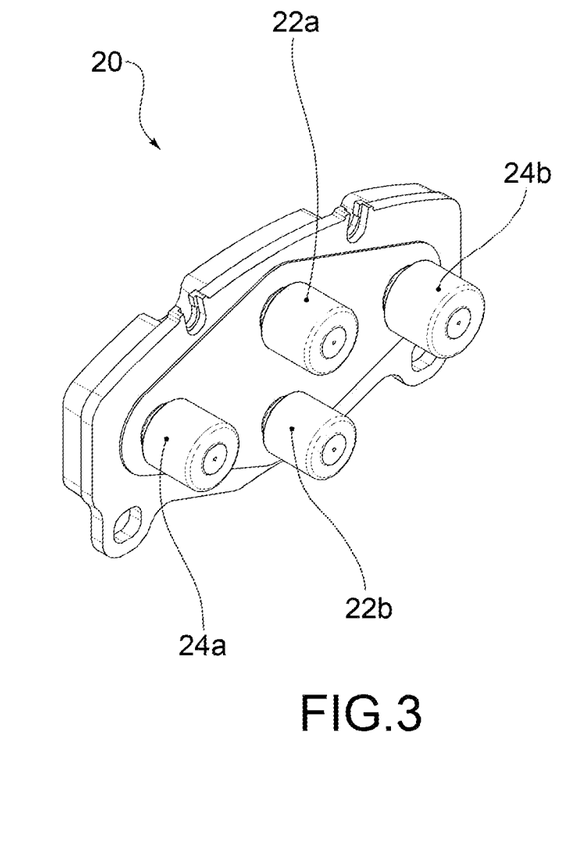
FIG. 3 shows a pad engaged with pistons of the caliper in FIG. 1.
Figure 4:
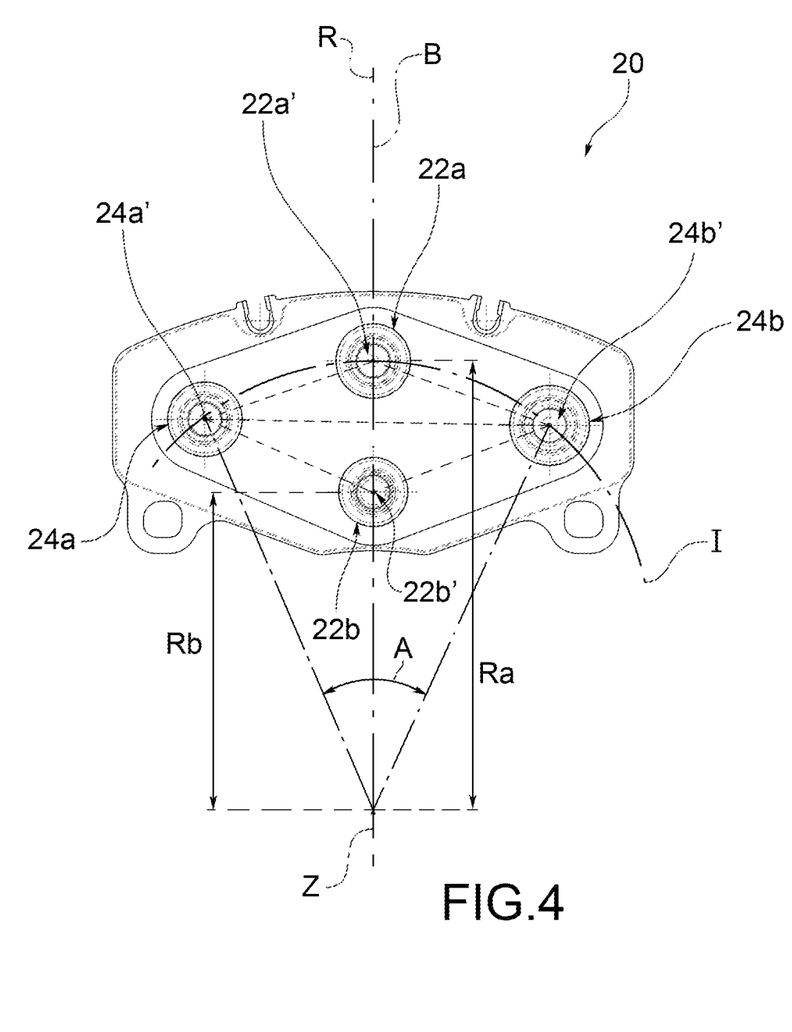
FIG. 4 shows a rear front view of the pad with pistons in FIG. 3.

The connection branch 72 leads onto the front portion 4a with a front gap 74 and onto the rear portion 4b with a rear gap 76, intended to be plugged. The front gap 74 on one side of the caliper body 2 is instead intended to be connected to the front gap 74' of the other side of the caliper body through a bridge pipe 78, generally constituted by a tube, applied externally to the caliper body 2 (FIG. 1).

Figure 11:
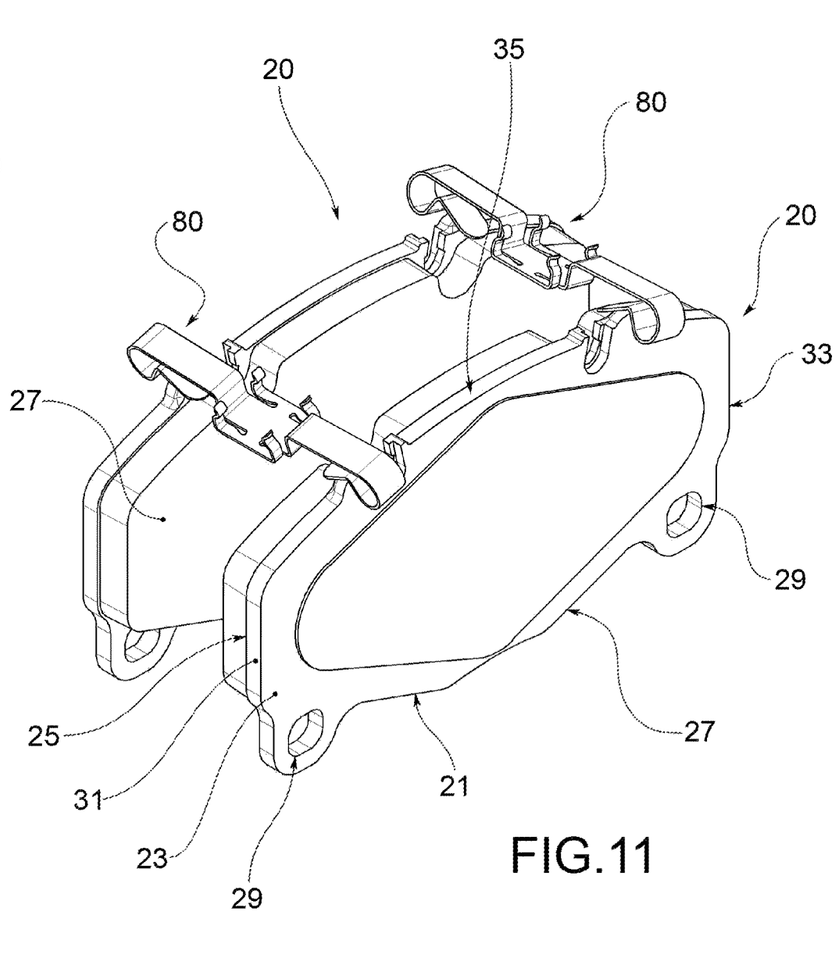
FIG. 11 shows pads coupled with return springs according to another aspect of the present invention.

According to another aspect of the present invention, the pads 20 are permanently biased towards the respective rest position by at least one spring 80, preferably by a pair of identical springs 80, preferably obtained by bending an appropriately shaped steel sheet.

A pad 20 comprises a supporting plate 21, having an outer surface 23 intended for the action of the pistons, and an opposite inner surface 25, and friction material 27 carried by the supporting plate 21 on the inner surface 25.

The supporting plate 21 has a proximal edge 27, at which eyelets 29 are obtained for supporting the pad 20 in sliding manner, sides 31, 33, and a distal edge 35, to which the spring 80 is applied.

Figure 12:
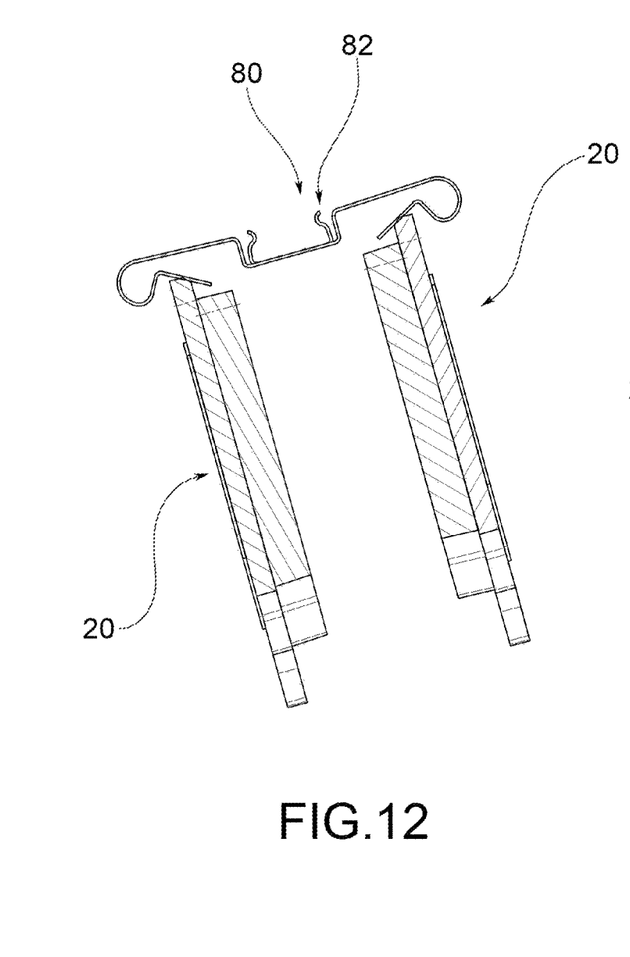
FIG. 12 shows a section of the pads with return springs in FIG. 11.

The spring 80, which operates on both pads 20 at the same time, comprises a central strip 82 which extends axially, when the spring 80 is applied to the caliper body 2, between the pads 20, straddling the disc.

Figure 13:
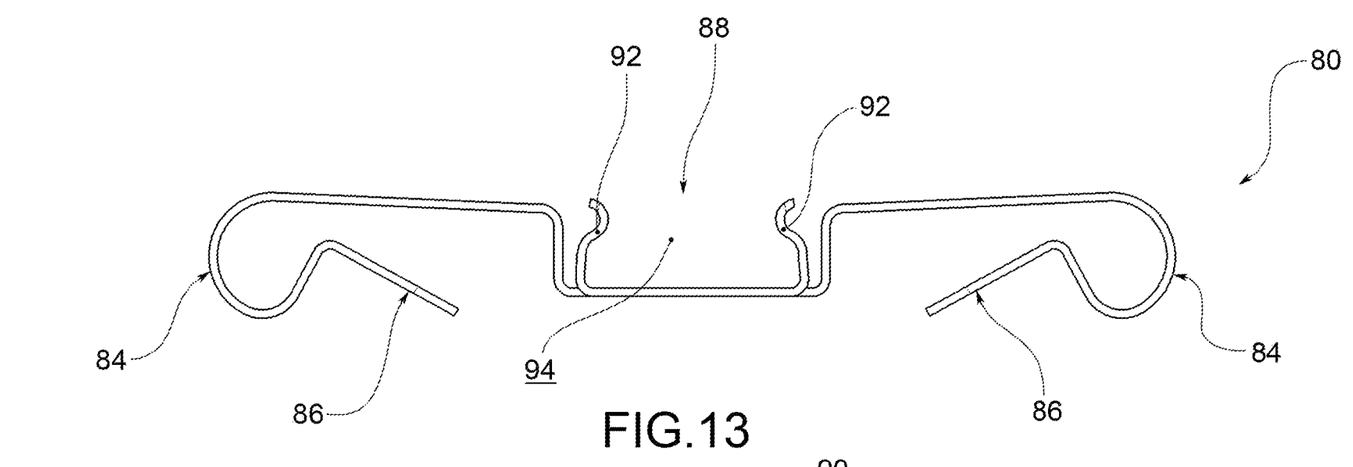
FIGS. 13 and 14 show the return spring in FIG. 11.
Figure 14:
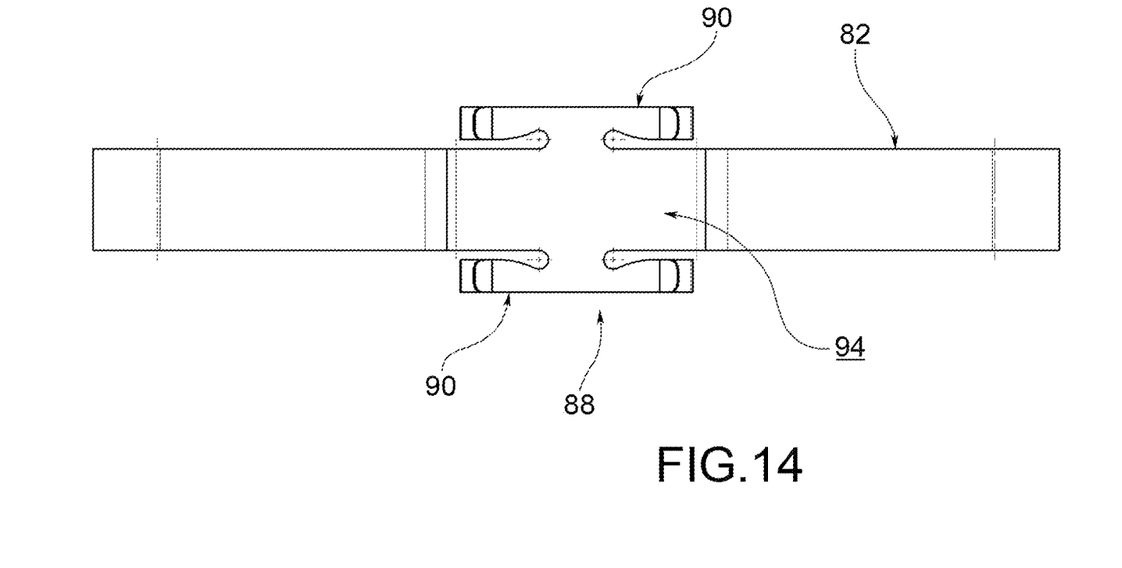

The central strip 82 is folded at the ends so as to form, for each end, a curl 84, which then extends on an abutment plane 86, intended to come into contact with the distal edge 35 of the pads 20.

The spring 80 further comprises a coupling portion 88 arranged centrally, comprising two pairs 90 of wings 92; the two pairs 90 are arranged side by side to the strip 82, in a stretch thereof which forms a recess 94.

Innovatively, the caliper according to the present invention is particularly rigid, and thus allows to apply prompt, vigorous braking; such a behavior is conferred, moreover, by the arrangement of the pistons, which determine a center of gravity very close to the center of gravity of the bridge portion sections.

Furthermore, the consumption of friction material, as well as the pressure distribution on the braking band, is advantageously even.

According to a further advantageous aspect, the manufacturing process of the brake caliper is very reliable, and in particular the making of a hole on the semi-finished caliper body for forming the hydraulic connection between the piston chambers prevents the core from having weakened portions which could be easily subject to breakage during casting.

It is apparent that a person skilled in the art may made changes to the caliper described above, all of which are contained within the scope of protection as defined in the following claims, in order to satisfy contingent needs.

The invention claimed is:

1. A lost core for the realization by gravity casting of a caliper body, comprising:
   a core body intended to obtain the space in the caliper body for housing a pair of pads having friction material adapted to be supported by the caliper body;
   intermediate chamber cores comprising a proximal piston chamber core and a distal piston chamber core, wherein each of the intermediate chamber cores project axially from first and second sides of the core body for the realization on each side of a proximal piston chamber and a distal piston chamber; and
   a proximal branch core that protrudes from the proximal piston chamber core and extends towards the distal piston chamber core and a distal branch core that protrudes from the distal piston chamber core and extends towards the proximal piston chamber core;
   wherein the proximal branch core and the distal branch core terminate with a respective free end separated from each other.

2. The lost core of claim 1, wherein said proximal branch core and said distal branch core are adapted to form an oil feeding circuit in the caliper body.

3. The lost core of claim 1, wherein pressure centers for caliper body pistons developed from said intermediate chamber cores and two side chamber cores fall at vertices of an imaginary rhombus for which a minor diagonal is disposed radially and a major diagonal is disposed laterally.

4. The lost core of claim 3, wherein said minor diagonal intersects said major diagonal of the imaginary rhombus at a midpoint of the imaginary rhombus.

5. The lost core of claim 3, wherein each of said first and second sides of said core body has a total of only four pressure centers.

6. The lost core of claim 3, wherein the pressure centers fall within peripheral contours of each pad of the pair of pads.

7. The lost core of claim 4, wherein said pressure centers are arranged so that said major diagonal extends between said side chamber cores without intersecting with said immediate chamber cores.

8. A lost core for a caliper body, comprising:
   a core body to create the caliper body including a pair of pads having friction material adapted to be supported by the caliper body;
   first and second intermediate chamber cores comprising a proximal piston chamber core and a distal piston chamber core, wherein the intermediate chamber cores project axially from both first and second sides of the core body to create on each side of a proximal piston chamber and a distal piston chamber for the caliper body, wherein said first and second intermediate chamber cores are the only intermediate chamber cores; and
   a proximal branch core that protrudes from the proximal piston chamber core and extends towards the distal piston chamber core and a distal branch core that protrudes from the distal piston chamber core and extends towards the proximal piston chamber core;
   wherein the proximal branch core and the distal branch core terminate with a respective free end separated from each other;
   wherein centers of said cores are arranged at vertices of an imaginary rhombus for which a minor diagonal is disposed radially and a major diagonal is disposed laterally,
   wherein said vertices fall within peripheral contours of each pad of the pair of pads;
   wherein vertices are arranged so that said major diagonal extends between two side chamber cores without intersecting with said immediate chamber cores.

\* \* \* \* \*